(12) United States Patent
Low et al.

(10) Patent No.: US 12,432,151 B2
(45) Date of Patent: Sep. 30, 2025

(54) MINI-TOKEN BUCKET FOR UPLINK TRANSMISSION

(71) Applicant: GREATER SHINE LIMITED, New Taipei (TW)

(72) Inventors: Su-Lin Low, San Diego, CA (US); Tianan Ma, Palo Alto, CA (US); Hong Kui Yang, San Diego, CA (US); Hausting Hong, San Diego, CA (US); Chun-I Lee, Pleasanton, CA (US)

(73) Assignee: GREATER SHINE LIMITED, New Taipei (TW)

( * ) Notice: Subject to any disclaimer, the term of this patent is extended or adjusted under 35 U.S.C. 154(b) by 478 days.

(21) Appl. No.: 17/902,160

(22) Filed: Sep. 2, 2022

(65) Prior Publication Data

US 2023/0006935 A1    Jan. 5, 2023

Related U.S. Application Data

(63) Continuation of application No. PCT/US2021/012660, filed on Jan. 8, 2021.
(Continued)

(51) Int. Cl.
*H04W 36/06* (2009.01)
*H04B 7/04* (2017.01)
(Continued)

(52) U.S. Cl.
CPC ............ *H04L 47/215* (2013.01); *H04L 47/24* (2013.01); *H04L 47/6215* (2013.01)

(58) Field of Classification Search
CPC . H04W 28/24; H04W 36/06; H04W 28/0263; H04W 28/0268; H04W 28/16;
(Continued)

(56) References Cited

U.S. PATENT DOCUMENTS 10,341,239 B2 * 7/2019 Lee .......................... H04L 41/50
10,838,945 B2 * 11/2020 Xu .......................... G06F 16/951
(Continued)

FOREIGN PATENT DOCUMENTS

CN      104079499 A      10/2014
CN      110474849 A      11/2019

OTHER PUBLICATIONS

International Search Report in the international application No. PCT/US2021/012660, mailed on Mar. 29, 2021.
(Continued)

*Primary Examiner* — Edan Orgad
*Assistant Examiner* — Vanneilian Lalchinthang
(74) *Attorney, Agent, or Firm* — BAYES PLLC

(57) ABSTRACT

Embodiments of apparatuses and methods for uplink data transmission preparation and a baseband chip for packet preparation for uplink transmission are disclosed. In an example, a method for packet preparation for uplink transmission can include determining, by a user equipment, a quality of service identifier associated with a quality of service flow. The method can also include mapping, by the user equipment, the quality of service identifier to a group token level. The method can further include processing, by the user equipment, the quality of service flow in accordance with the group token level.

17 Claims, 8 Drawing Sheets

Related U.S. Application Data

(60) Provisional application No. 62/984,180, filed on Mar. 2, 2020.

(51) Int. Cl.
*H04L 12/26* (2006.01)
*H04L 47/215* (2022.01)
*H04L 47/24* (2022.01)
*H04L 47/62* (2022.01)
*H04W 28/02* (2009.01)

(58) Field of Classification Search
CPC ..... H04W 28/26; H04W 74/00; H04W 76/10; H04W 8/04; H04W 28/0289; H04W 4/40; H04W 72/23; H04W 84/12; H04L 47/215; H04L 47/24; H04L 41/0806; H04L 41/0895; H04L 47/6215; H04L 65/40; H04L 27/2603
USPC .......................................................... 370/235
See application file for complete search history.

(56) References Cited

U.S. PATENT DOCUMENTS

| | | | | |
|---|---|---|---|---|
| 2007/0147244 | A1* | 6/2007 | Rasanen | H04W 28/16 370/231 |
| 2008/0192764 | A1* | 8/2008 | Arefi | H04L 47/10 370/412 |
| 2009/0190471 | A1* | 7/2009 | Mahendran | H04L 47/215 370/230.1 |
| 2010/0265823 | A1* | 10/2010 | Zhao | H04W 28/12 370/233 |
| 2012/0057547 | A1* | 3/2012 | Lohr | H04W 52/346 370/329 |
| 2016/0142934 | A1* | 5/2016 | Ahmadzadeh | H04W 28/06 370/328 |
| 2017/0255693 | A1* | 9/2017 | Trifunovic | G06F 16/909 |
| 2017/0289046 | A1* | 10/2017 | Faccin | H04W 28/0268 |
| 2018/0213540 | A1* | 7/2018 | Chiu | H04L 69/22 |
| 2019/0320362 | A1* | 10/2019 | Liu | H04W 28/0263 |
| 2022/0191733 | A1* | 6/2022 | Ali | H04L 43/16 |

OTHER PUBLICATIONS

Written Opinion of the International Searching Authority in the international application No. PCT/US2021/012660, mailed on Mar. 29, 2021.

First Office Action of the Chinese application No. 202180017809.3, issued on Dec. 18, 2024, 15 pages with English translation.

Decision of Rejection of the Chinese application No. 202180017809.3, issued on Jul. 31, 2025, 11 pages with English translation.

* cited by examiner

MINI-TOKEN BUCKET FOR UPLINK TRANSMISSION

CROSS-REFERENCE TO RELATED APPLICATIONS

The present application is a continuation of International Application No. PCT/US2021/012660 filed on Jan. 8, 2021, which claims the benefit of priority to U.S. Provisional Application No. 62/984,180 filed on Mar. 2, 2020, both of which are incorporated herein by reference in their entireties.

BACKGROUND

Embodiments of the present disclosure relate to apparatuses and methods that may be used to prepare data for transmission in uplink.

Wireless communication systems are widely deployed to provide various telecommunication services such as telephony, video, data, messaging, and broadcasts. Various wireless communication systems rely on uplink communication of data. For example, in a fifth-generation (5G) communication system, an access node may schedule uplink transmission by one or more user equipment devices. The user equipment devices may be responsible for communicating data in the uplink according to the schedule. When the data is sent by the user equipment the user equipment may have more data to send than can be sent within the schedule. Accordingly, the user equipment may need to send data according to some prioritization.

SUMMARY

Embodiments of methods and apparatuses that may be used to prepare data to be transmitted in uplink communication are disclosed herein.

In one example, a method for packet preparation for uplink transmission can include determining, by a user equipment, a quality of service identifier associated with a quality of service flow. The method can also include mapping, by the user equipment, the quality of service identifier to a group token level. The method can further include processing, by the user equipment, the quality of service flow in accordance with the group token level.

In another example, an apparatus for packet preparation for uplink transmission can include at least one processor and at least one memory including computer program code. The at least one memory and the computer program code can be configured to, with the at least one processor, cause the apparatus at least to determine a quality of service identifier associated with a quality of service flow. The at least one memory and the computer program code can also be configured to, with the at least one processor, cause the apparatus at least to map the quality of service identifier to a group token level. The at least one memory and the computer program code can further be configured to, with the at least one processor, cause the apparatus at least to process the quality of service flow in accordance with the group token level.

In a further example, a baseband chip for packet preparation for uplink transmission can include a service data adaptation protocol circuit, a packet data convergence protocol circuit, and a medium access control circuit. The service data adaptation protocol circuit can be configured to determine a quality of service identifier associated with a quality of service flow, map the quality of service identifier to a group token level, process the quality of service flow in accordance with the group token level, and provide the quality of service flow to the packet data convergence protocol circuit to passed toward the medium access control circuit for transmission by a physical layer circuit.

BRIEF DESCRIPTION OF THE DRAWINGS

The accompanying drawings, which are incorporated herein and form a part of the specification, illustrate embodiments of the present disclosure and, together with the description, further serve to explain the principles of the present disclosure and to enable a person skilled in the pertinent art to make and use the present disclosure.

Figure 1:
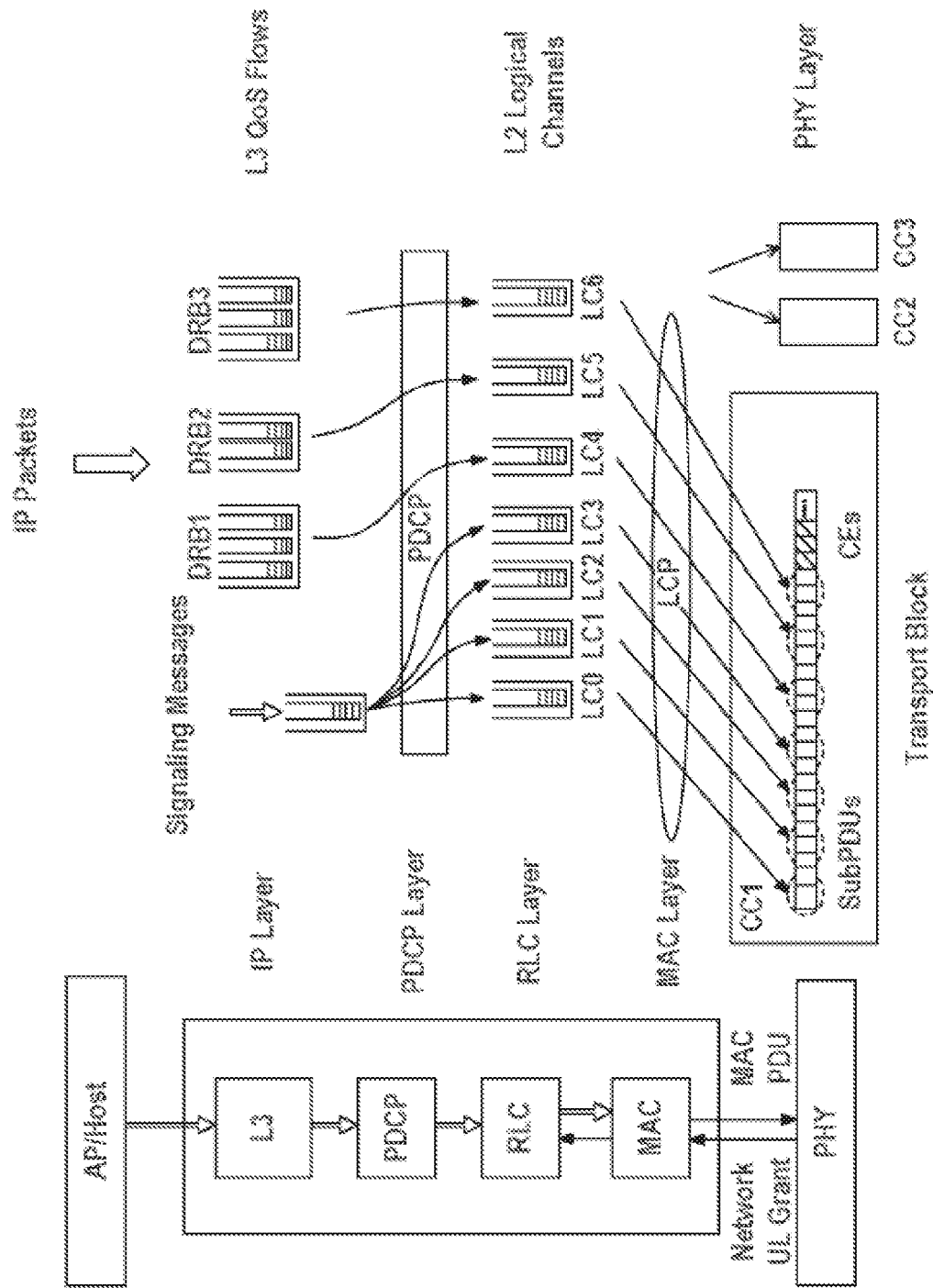
FIG. 1 illustrates a modem data processing stack.

Embodiments of the present disclosure will be described with reference to the accompanying drawings.

DETAILED DESCRIPTION

Although specific configurations and arrangements are discussed, it should be understood that this is done for illustrative purposes only. A person skilled in the pertinent art will recognize that other configurations and arrangements can be used without departing from the spirit and scope of the present disclosure. It will be apparent to a person skilled in the pertinent art that the present disclosure can also be employed in a variety of other applications.

It is noted that references in the specification to "one embodiment," "an embodiment," "an example embodiment," "some embodiments," "certain embodiments," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure or characteristic is described in connection with an embodiment, it would be within the knowledge of a person skilled in the pertinent art to effect such feature, structure or characteristic in connection with other embodiments whether or not explicitly described.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The techniques described herein may be used for various wireless communication networks such as Long-Term Evolution (LTE) system, code division multiple access (CDMA) system, time division multiple access (TDMA) system, frequency division multiple access (FDMA) system, orthogonal frequency division multiple access (OFDMA) system, single-carrier frequency division multiple access (SC-FDMA) system, and other networks. The terms "network" and "system" are often used interchangeably. A CDMA network may implement a radio technology such as Universal Terrestrial Radio Access (UTRA), CDMA 2000, etc. UTRA includes Wideband CDMA (WCDMA) and other variants of CDMA. CDMA 2000 covers IS-2000, IS-95, and IS-856 standards. A TDMA network may implement a radio technology such as Global System for Mobile Communications (GSM). An OFDMA network may implement a radio technology such as new radio (NR) (e.g., 5G RAT), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies.

FIG. 1 illustrates a modem data processing stack. As shown in FIG. 1, in a 5G cellular wireless modem, the packet data protocol stack includes the Internet protocol (IP) layer (also known as Layer 3 (L3)), the packet data convergence protocol (PDCP) layer, the radio link control (RLC) layer, and the media access control (MAC) layer. Each layer is responsible for processing the user plane packet data in the form of IP data or raw user data and ensuring that data transmission is secure, on-time, and error-free. A user equipment (UE) can be configured to transmit uplink data packets through resource allocations scheduled by the network, for example, by the base station or the like.

In the uplink (UL) direction, incoming packet data from an external application processor (AP) or a host (e.g., through universal serial bus (USB) or peripheral component interconnected express (PCIe)) in the form of IP packets from a protocol data unit (PDU) session arrives at the Layer 3 protocol stack. These IP packets are classified into L3 quality of service (QoS) flows and mapped to each data radio bearer (DRB), shown as DRB1, DRB2, and DRB3. Thus, incoming IP packets from AP/hosts may first be sorted into L3 QoS flows with a QoS flow indicator (QFI), and can be mapped to specific data radio bearers according to the grouping of similar traffic requirements by the network.

Packets in each DRB will be dequeued and processed by the packet data convergence protocol (PDCP) layer. PDCP layer processing includes robust header compression (ROHC) and security functions, such as integrity checking and ciphering. Once the PDCP layer processing is done, the packets are queued into their corresponding Layer 2 (L2) logical channels (LCs), identified as LC0, LC1, LC2, LC3, LC4, LC5, and LC6. In the meantime, modem signaling messages also arrive at their Layer 2 logical channels for signaling messages.

At the physical (PHY) layer, at every slot, the physical downlink control channel (PDCCH), which contains the downlink control indicator (DCI) information, is decoded. The DCI contains the dynamic grant allocation for dynamic uplink transmission, for a slot transmission at an indicated time.

At the MAC layer, once the dynamic grant allocation size is calculated, the modem can dequeue and gather L2 packets from the logical channels through a logical channel prioritization (LCP) algorithm as specified in the 3GPP standard. Typically, the grant bytes are distributed evenly between all the L3 QoS flows without any priority considerations. Bytes are dequeued on first-come-first-served schemes, as and when grant bytes for the logical channel are available. The MAC layer can then compose the MAC protocol data unit (PDU) in a transport block for the PHY layer to be sent out. There is one such transport block for each component carrier. Hence packet data is being transmitted out from the packet data stack to the base station (BS) according to the logical channel prioritization in the base station-allocated uplink grant size for each slot.

Thus, at every slot, the network can allocate a grant size for the user equipment for uplink transmission. The UL MAC at the UE can then perform LCP to schedule the allocated grant for each logical channel. Based on these grant bytes for each LC, the maximum number of data packets within the grant allocation can be dequeued for MAC, where these data packets can be combined together into a MAC PDU for UL data transmission.

MAC sub-PDU (MacSubPDU) packets can be prepared in L2 logical channel queues after L3 data arrives at the modem. Once a dynamic grant is allocated by a base station and received by the MAC layer, the MAC layer can perform logical channel prioritization to create a MAC PDU with the exact grant size. The packets in the logical channels are extracted with priority accordingly from the logical channel prioritization. After that, the MAC PDU is transferred to the physical layer for transmission.

In another approach, logical channel L2 data within each individual logical channel queue are combined a few packets at a time to a continuous block. However, they are not prepared in a MAC PDU format because the exact grant allocation size is still not known yet. Once a dynamic grant is allocated by the base station and received by the MAC layer, the MAC layer performs the logical channel prioritization to create the MAC PDU with the exact grant size. The packets in the logical channels are extracted with priority accordingly from the logical channel prioritization. After that, the MAC PDU is transferred to the physical layer for transmission. The assembly of a first transport block corresponding to a component carrier (CC) is shown for CC1, but a similar assembly may occur for each of CC2 and CC3 and so on, as well. Each component carrier can include one transport block.

Typically, the physical layer may save a copy of the entire transport block for re-transmission purposes at the PHY layer.

One challenge in UL MAC transmission is in the servicing of the grant bytes for each logical channel that has MAC PDU content for transmission. Given a calculated allocated grant size for the logical channel, the UL MAC may need to dequeue packets from the L2 logical channel queue, which may be fed by multiple L3 QoS flows. The draining of data packets from these L3 QoS flows into the L2 LC may present a challenge with its various QoS flow parameters, and are not defined by existing standards.

As a result, there may be an absence of differentiated services for all the QoS flows in each logical channel. Moreover, there may be an inefficient resource allocation with only one level of priority, regardless of application QoS requirements. Furthermore, there may be an inflexible resource allocation for only one type of traffic and delay requirements.

Certain embodiments of the present disclosure provide a 5G UL scheduling method for prioritizing the packet data dequeuing from layer 3 QoS flows to layer 2 logical channels for UL MAC PDU data transmission. Certain embodiments take into consideration key critical QoS parameters, and can provide a simple, fast, and efficient mechanism to allocate grant bytes to each flow to be used without wastage, thus achieving differentiated service treatment for each QoS flow.

Certain embodiments of the present disclosure may employ any of the following three aspects alone or in combination with one another: a priority scheme for dequeuing L3 packets in each UL QoS flow sharing the same DRB, flexible mapping of each QoS flow priority to a group token level for resource allocation, or scheduling of packet transmission for each QoS flow from its group token level access.

For example, in certain embodiments, the scheduling of L3 data packets from several UL QoS flows, which share the same data radio bearer, to L2 MAC for UL transmission, can be differentiated for each flow with optimized performance. With a given LC token bucket bytes resource from L2 MAC LCP for each LC, the resource can be distributed optimally to each of the UL QoS flows constituting this DRB channel.

For another example, certain embodiments take into account the QoS flow's 5G QoS characteristic(s) including priority level, resource traffic type, and packet delay budget or latency requirement, and can map them to a "group token level" with defined resource allocation bytes. The mapping can be defined whenever a QoS flow is set up and can be tuned flexibly at static setup or dynamic runtime to suit application performance needs.

For a further example, in certain embodiments, with a given total LC token bucket bytes resource from L2 LCP for each LC, the resource bytes can be distributed to each QoS flow according to its group token access level. The packets can be pulled into the L2 MAC PDU for transmission at the next transmission slot/symbol.

Figure 2:
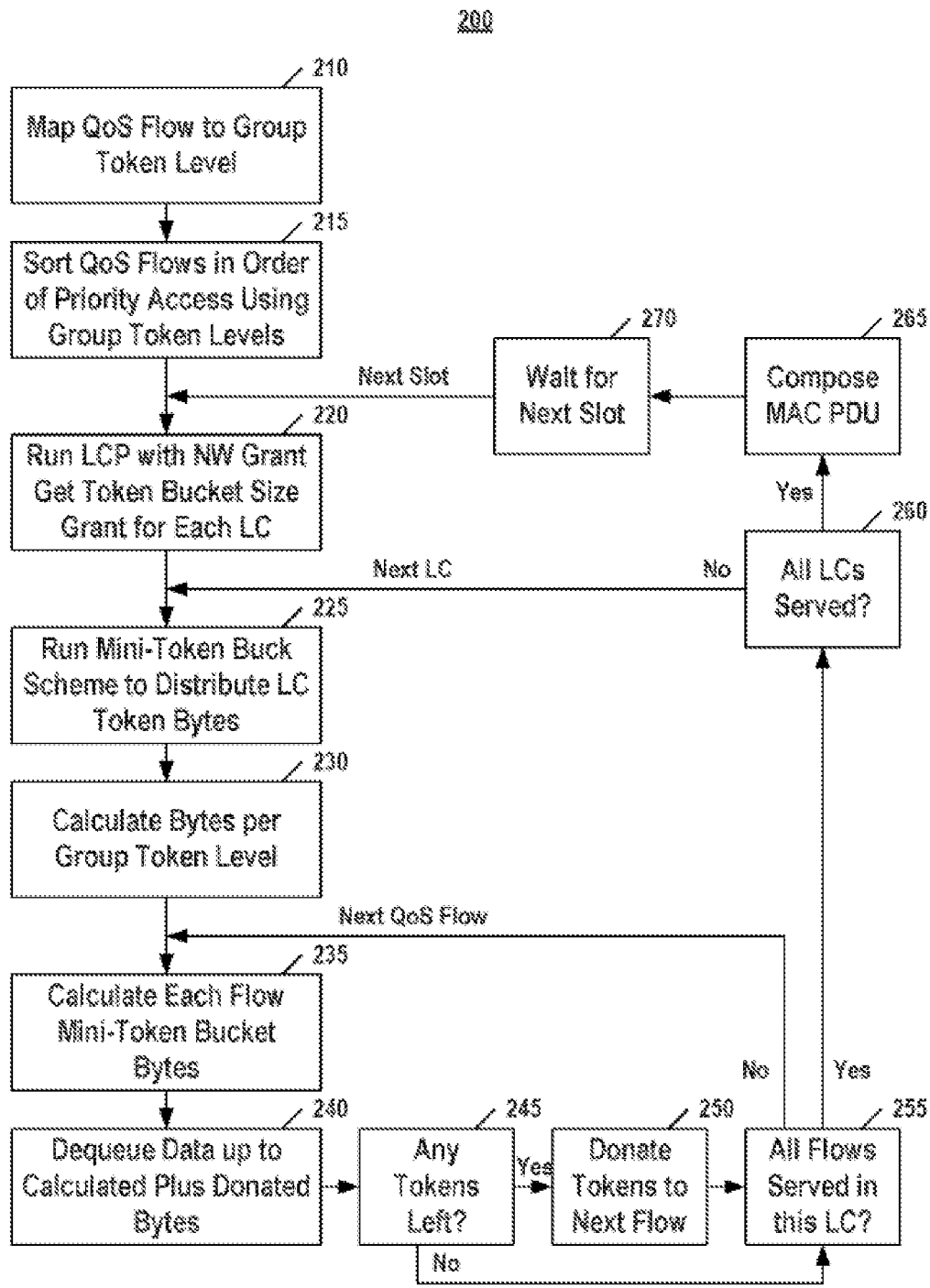
FIG. 2 illustrates an example method for packet preparation for uplink transmission according to certain embodiments of the present disclosure.

FIG. 2 illustrates an example method 200 for packet preparation for uplink transmission according to certain embodiments of the present disclosure. As shown in FIG. 2, method 200 can include, at 210, upon radio resource control setup, for each LC, mapping each QoS flow to a group token level.

At setup, for each LC, the mapping of each QoS flow to a group token level can be performed in a variety of ways, with the following explanation providing an example.

At QOS Flow setup with a QFI, with an associated 5G QoS Identifier (5QI), the system can construct the mapping of each flow's 5QI attributes, for example, priority level, traffic resource type, and/or packet delay budget, to a group token level. This mapping can be flexibly tuned for each DRB with the weights of K1, K2, K3 values, and can have a separate set for each LC or even for each QoS flow, depending on the application requirements.

Thus, group token level $(L)=(K1)*(P)+(K2)*(R)+(K3)*(D)$, where L is the group token level for a QoS FlowId queue, P is a mapped priority level for QoS Flow (range from 1-100), R is a mapped resource type (non-GBR, GBR, or Delay-Critical GBR), and D is a mapped Packet Delay Budget (range from 5 ms to 500 ms). The discrete Group_Token_Levels can be any implementation of specific levels.

Table 1 illustrates an example of possible mapping:

TABLE 1

| Priority Level (P) | Resource Type (R) | Packet Delay Budget (D) | Mapped Group Token Level (L) |
|---|---|---|---|
| 1-10 | Delay Critical GBR | 5 ms-20 ms | 8 |
| 11-20 | | 21 ms-40 ms | 7 |
| 21-30 | GBR | 41 ms-70 ms | 6 |
| 31-50 | | 71 ms-100 ms | 5 |
| 41-50 | | 101 ms-200 ms | 4 |
| 51-70 | non-GBR | 201 ms-300 ms | 3 |
| 71-90 | | 301 ms-400 ms | 2 |
| 91-100 | | 401 ms-500 ms | 1 |

FIG. 2 shows an example of how this mapping can be statically determined at setup time to configure a group token level. This can be adjusted for each flow or DRB as suitable.

Figure 4:
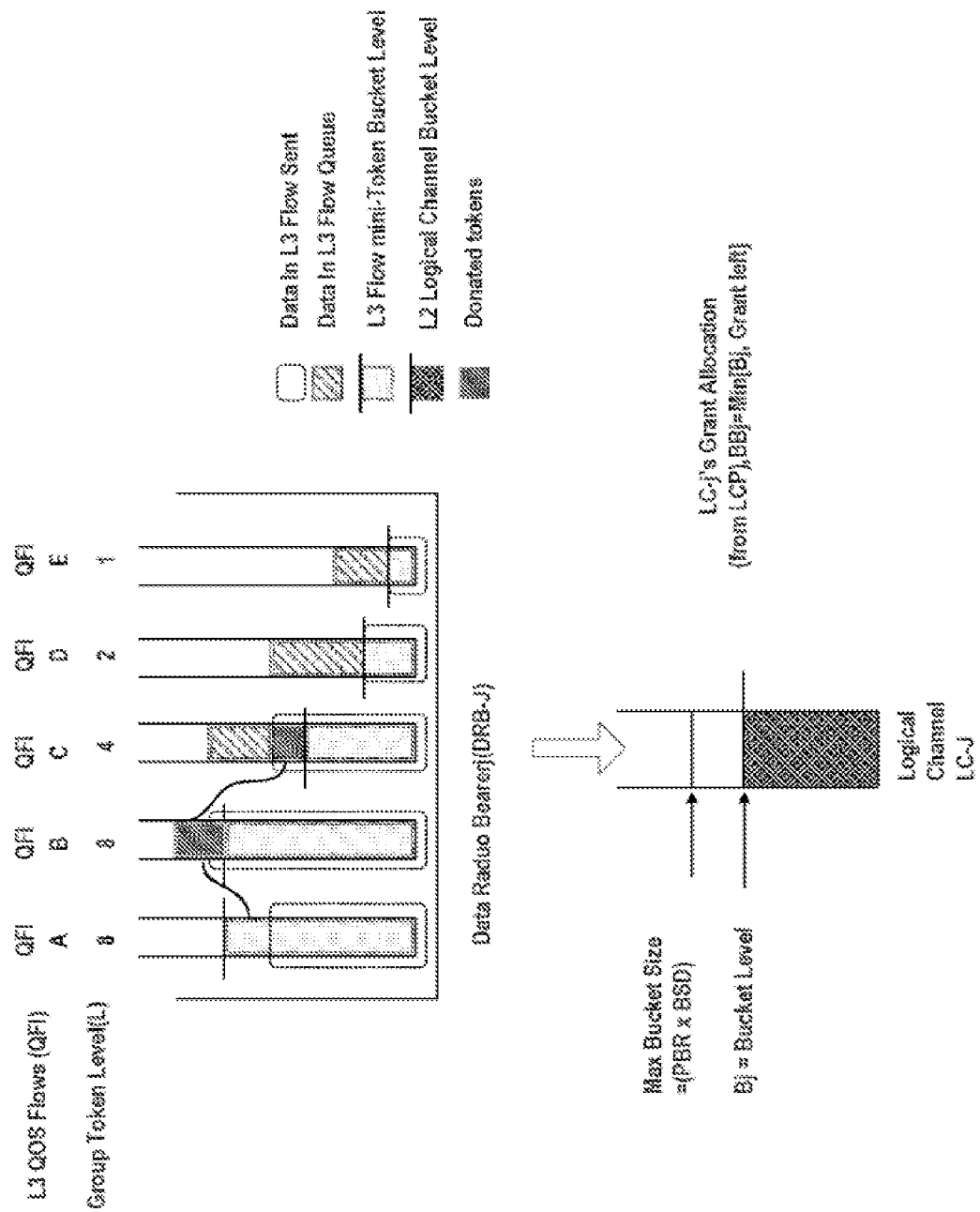
FIG. 4 illustrates an example of group token level usage corresponding to table 1, according to certain embodiments of the present disclosure.

FIG. 4 illustrates an example of group token level usage corresponding to Table 1, according to certain embodiments of the present disclosure. In the example, QoS flows are mapped into 8 group token levels, where Level 8 is the highest priority, and Level 1 is the lowest priority. Priority level can map the range of 1-100 into these 8 levels as shown in Table 1, or in any other desired way. Similarly, resource type can be mapped, such that delay-critical guaranteed bit rate (GBR) is mapped to Level 8, GBR to level 6, and non-GBR to level 3, although any other desired mapping can be used. Likewise, packet delay budget can be mapped across the eight levels such that 5-20 ms maps to Level 8, 401-500 ms maps to Level 1, and other intervals map to levels 2-7 (see Table 1 for more details of this example), although any other desired mapping can be used.

With the weight factors K1, K2, and K3, a normalized group token level (L) can be obtained. L can reflect the desired priority token level of a flow corresponding to a given QoS flow identifier.

Certain embodiments can allocate an infinite priority queue with the highest priority and no bucket size limit for absolutely highest priority applications, such as transmission control protocol (TCP) acknowledgment (ack) for a logical channel TCP/IP transfer.

In the example of FIG. 4, QFI A has been determined to have a group token level of 8, QFI B has also been determined to have a group token level of 8, QFI C has been determined to have a group token level of 4, QFI D has been determined to have a group token level of 2, and QFI E has been determined to have a group token level of 1.

As shown in FIG. 2, at 215, the system implementing the method (for example, a user equipment or modem or other component or subcomponent thereof) may, for each LC, sort the QoS flows in order of priority access using group token levels. Thus, once the mapping is done, the QoS flow L3 queue can be sorted in order of priority access, where the highest group token level is put at the head of the queue. In the example of FIG. 4, the flow with QFI A has the highest level, as does the flow with QFI B. In cases of a tie, the system may randomly select between flows with tied levels.

As shown in FIG. 2, at 220, for every slot, the system may run LCP with the NW grant to obtain an LC token bucket size grant for each LC. Once the UE is in connected mode, at every slot, the network can allocate a grant size number of bytes for each component carrier, each MAC instance, corresponding to a transport block. This grant can then be distributed to the UE's logical channels per an LCP algorithm according to the 3GPP MAC standard, where each logical channel, j, is given a grant allocation up to a bucket level, Bj. With this grant allocation, each logical channel can dequeue packet data to the MAC, and the MAC can compose the MAC PDU and schedule the data transmission per slot.

In a mini-token bucket scheme, the total LC token bucket bytes resource from L2 LCP for each LC, can be further distributed to each QoS flow according to its group token level access in order to dequeue packets according to QoS priority levels.

For example, as shown in FIG. 2 at 225, for each LC, the system may run a mini-token bucket scheme to distribute LC token bytes to each flow. The mini-token bucket scheme may include the following: at 230, calculating bytes per group token level for a given LC; at 235, calculating for each flow a number of mini-token bucket bytes; at 240, dequeueing data up to the number calculated at 235 plus any donated tokens; at 245, determining whether any tokens are left; at 250, donating any leftover tokens to a next flow; and at 255, determining whether all flows have been served for a given LC.

If it was determined at 245 that no tokens were left, the donating at 250 may be omitted. If at 255, it is determined that not all flows have been served, the system can, at 235, calculate the mini-token bucket bytes for the next flow. Alternatively, the mini-token bucket bytes for all the flows of a given LC may be calculated initially and then may be adjusted based on any donated tokens.

When it is determined that, for a given LC, all flows have been served, the system can, at 260, determine whether all LCs have been served. If not, the system can repeat the mini-token bucket scheme beginning at 225 for the next LC. Otherwise, at 265, the system can compose a MAC PDU with the dequeued data and provide the MAC PDU to the physical (PHY) layer for transmission. At 270, the system can then wait for the next slot, which can then trigger the process to continue from 220.

The calculation at 230 can be performed in variety of ways. For example, BB j can be the total LC token bucket bytes resources from the L2 LCP calculations for a given LC j. In this case, BBj=MM [Bj, GrantLeft], where Bj is a bucket level from L2 MAC for this LC j at current transmission slot/occasion according to a LCP algorithm (see, for example, 3GPP2 TS 38.321) and GrantLeft is a MAC grant size remaining for this LC j, after serving any higher priority LCs, and where MAC grant size is the resource allocation given by the NW for UE for this MAC instance. $B\_n$, namely bytes per group token level at slot n can be calculated as: $B\_n = BBj/(\Sigma(Group\_Token\_Levels))$ for all flows). This sum can be the summation of all the token levels for each flow, and $B\_n$ can be the basic token bytes per level unit for this DRB/LC j at current slot n.

Likewise, the calculation at 235 can be performed in a variety of ways. For example, for each flow i in this DRB/LC j, $MB\_i$, namely the flow mini-token bucket bytes, can be derived. This can be the token resource allocation bytes for this flow i. For example, $MB\_i = (L\_i) \cdot (B\_n)$, where $MB\_i$ is the flow mini-token bucket bytes for this flow i, at slot n, $L\_i$ is the group token level for this flow I, and $B\_n$ is the bytes per group token level, at slot n.

FIG. 4 illustrates an example of the dequeueing at 240. For each flow i, data packets can be dequeued till the token bytes for this flow ($MB\_i$) are used up. If the flow mini-token bucket bytes from one priority flow are unused after all data from this flow queue i are dequeued, the unused bytes can be rolled over to the next priority flow in line. This can be seen in FIG. 4, where there are unused flow mini-token bucket bytes in QFI A, which are then rolled into QFI B, and then a smaller amount of unused flow mini-token bucket bytes in QFI B are rolled into QFI C.

All the flow token bucket bytes can be reset for each transmission slot. This may ensure that the high priority flows have constant, guaranteed data rate transfer. Only when data from the flows of the highest priority are exhausted, the token bytes from that flow can be donated to the next lower priority flows.

As mentioned above and illustrated in FIG. 2, the process can be performed until all the QoS flows in a given LC j are served, where either all the BBj (total LC token bucket bytes for this LCj) are used up, or the data bytes from all QoS flows are dequeued completely.

Once all the QoS flows in an LC are served, the remaining grant can be given to the next LC to be served until all LCs are served. The MAC PDU can then be composed with the packets dequeued from L3 QoS flows and sent to PHY layer for transmission.

Hence, by using certain embodiments of the present disclosure, data from multiple L3 QoS flows in the same DRB/LC can be dequeued with fast optimal priority performance, using minimal complexity.

Figure 3:
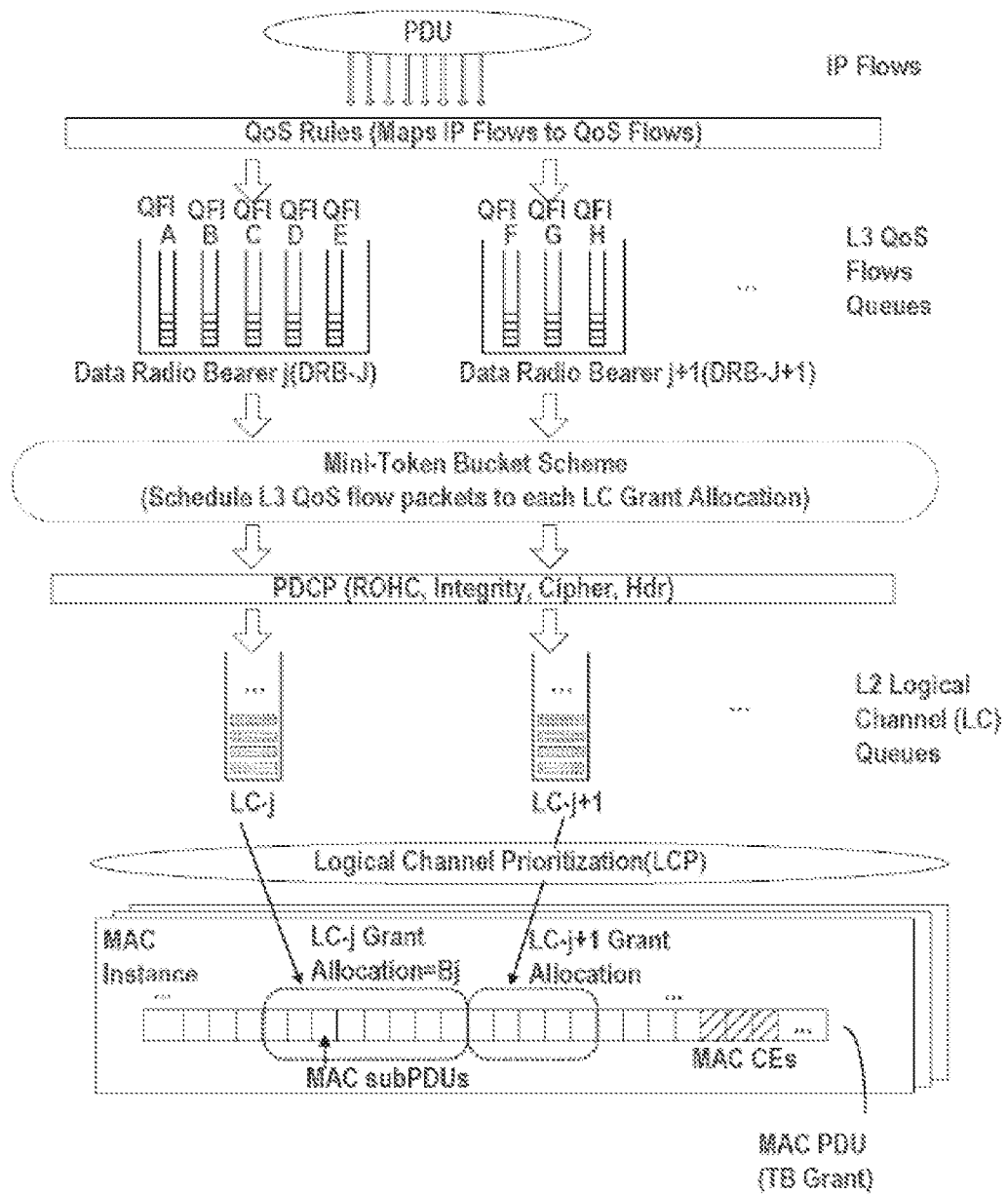
FIG. 3 illustrates an overflow of a packet flow according to certain embodiments of the present disclosure.

FIG. 3 illustrates an overflow of a packet flow according to certain embodiments of the present disclosure. As shown in FIG. 3, from top to bottom data may be taken from IP flows, placed into L3 QoS flow queues, and then placed into L2 logical channel queues. The L2 logical channels can be prioritized according to logical channel prioritization, and the data can be formed into a MAC PDU corresponding to a transport block grant.

More particularly, as shown in FIG. 3, QoS rules can be used to map IP flows to QoS flows. This can result in a number of different quality of service (QoS) flows having their own QFI, for each data radio bearer. The use of a mini-token bucket scheme, such as described above with reference to FIG. 2, can be used to schedule L3 QoS flow packets to each LC grant allocation.

Next, PDCP processing, as described above with reference to FIG. 1, can be performed, leading to L2 logical channel queues. Logical channel prioritization can be performed on these L2 logical channel queues, yielding MAC sub-PDUs that can be assembled, together with MAC control elements (CEs) and so on, to form a MAC PDU in each MAC instance.

Certain embodiments of the present disclosure may have various benefits and/or advantages. For example, certain embodiments may provide a straightforward, practical scheme with minimal software complexity. Moreover, certain embodiments may provide enhanced performance with prioritized packet delivery for delay-sensitive applications. Furthermore, certain embodiments may provide differentiated services for applications with different QoS flow requirements. Additionally, certain embodiments may eliminate the starving of low priority application data sending. Also, certain embodiments may provide efficient service distribution to all application service flows with maximal grant usage and minimal wastage.

Figure 5:
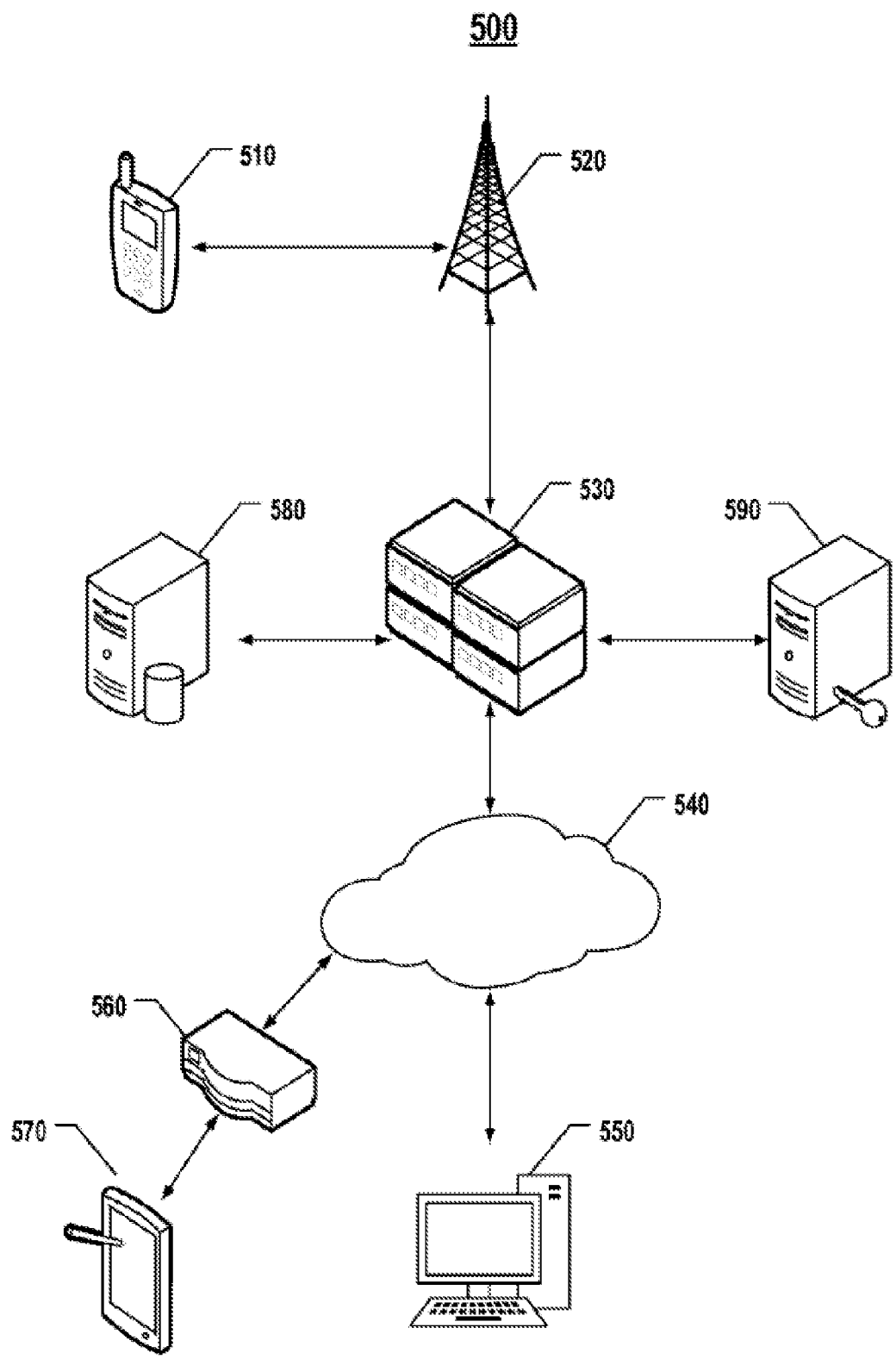
FIG. 5 illustrates an example wireless network according to certain embodiments of the present disclosure.

FIG. 5 illustrates an example wireless network 500, such as an NR or 5G network, in which aspects of the present disclosure may be performed, for example, for enabling uplink data preparation, as described in greater detail below. As shown in FIG. 5, wireless network 500 may include a network of nodes, such as a user equipment 510, an access node 520, and a core network element 530. User equipment 510 may be any terminal device, such as a smart phone, personal computer, laptop computer, tablet computer, vehicle computer, wearable electronic device, smart sensor, or any other device capable of receiving, processing, and transmitting information, such as any member of a vehicle to everything (V2X) network, a cluster network, a smart grid node, or an Internet-of-Things (IoT) node. Other devices are also permitted. User equipment 510 is illustrated as a smart phone simply by way of illustration and not by way of limitation.

An access node 520 may be a device that communicates with the user equipment 510, such as wireless access point, a base station, an enhanced Node B (eNB), a cluster master node, or the like. Access node 520 may have a wired connection to user equipment 510, a wireless connection to user equipment 510, or any combination thereof. Access node 520 may be connected to user equipment 510 by multiple connections, and user equipment 510 may be connected to other access nodes in addition to access node 520. Access node 520 may also be connected to other user equipment. Access node 520 is illustrated by a radio tower by way of illustration and not by way of limitation.

A core network element 530 may serve access node 520 and user equipment 510 to provide core network services. Examples of a core network element 530 include a home subscriber server (HSS), a mobility management entity (MME), a serving gateway (GW), a packet data network (PDN) GW. These are examples of core network elements of an evolved packet core (EPC) system, which is a core network for the LTE system. Other core network elements may be used in LTE and in other communication systems. Core network element 530 is shown as a set of rack-mounted servers by way of illustration and not by way of limitation.

Core network element 530 may connect with a large network, such as the Internet 540, or another IP network, to communicate packet data over any distance. In this way, data from user equipment 510 may be communicated to other user equipment connected to other access points, including, for example, a personal computer 550 connected to Internet 540, for example, using a wired connection, or a tablet 570 connected to Internet 540 via a router 560. Thus, personal computer 550 and tablet 570 provide additional examples of possible user equipment devices, and router 560 provides an example of another access point device.

A generic example of a rack-mounted server is provided as an illustration of core network element 530. However, there may be multiple elements in the core network including database servers, such as database 580, and security and authentication servers, such as authentication server 590. Database 580 may, for example, manage data related to user subscription to network services. A home location register (HLR) is an example of standardized database of subscriber information for a mobile network. Likewise, authentication server 590 may handle authentication of users, sessions, and so on. In 5G, an authentication server function (AUSF) may be the specific entity to perform user equipment authentication. In certain embodiments, a single server rack may handle multiple such functions, such that the connections between core network element 530, authentication server 590, and database 580 may be local connections within a single rack.

Certain embodiments of the present disclosure may be implemented in a modem of a user equipment, such as user equipment 510, tablet 570, or personal computer 550. For example, a modem or other transceiver of user equipment 510 may prepare packets for transmission and re-transmission to a communication from access node 520. As described above in detail, user equipment 510 may prepare packets and store them suitably at the MAC layer.

Each of the elements of FIG. 5 may be considered a node of a communication network. More detail regarding the possible implementation of communication nodes is provided by way of example in the description of FIG. 6 and node 600 below. For example, user equipment 510 in FIG. 5 may be implemented as node 600 shown in FIG. 6.

Figure 6:
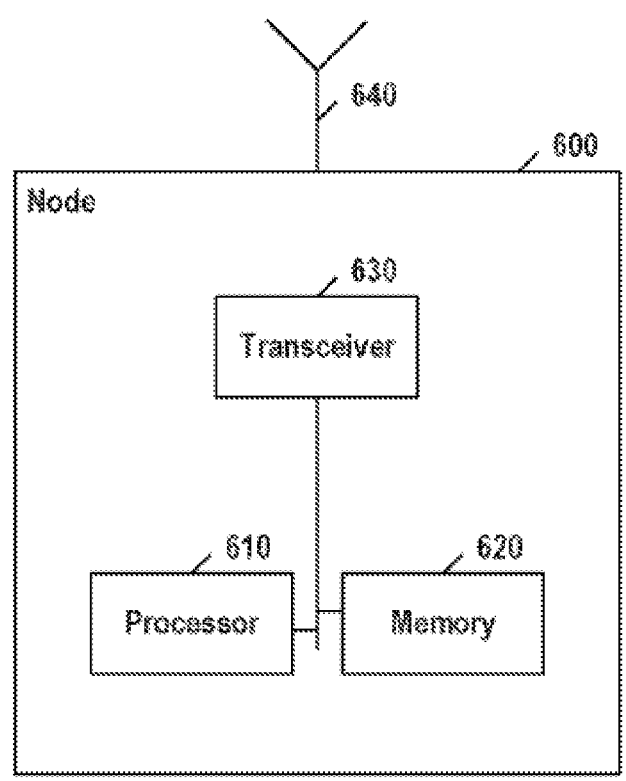
FIG. 6 illustrates a block diagram of an example node according to certain embodiments of the present disclosure.

FIG. 6 illustrates a device according to certain embodiments of the present disclosure. As shown in FIG. 6, a node 600 can include various components. Node 600 can correspond to user equipment 510, access node 520, or core network element 530 in FIG. 5. In some embodiments, node 600 corresponds to the modem in user equipment 510, access node 520, or core network element 530 in FIG. 5.

As shown in FIG. 6, node 600 can include a processor 610, a memory 620, and a transceiver 630. These components are shown as connected to one another by a bus, but other connection types are also permitted. Transceiver 630 may include any suitable device for sending and/or receiving data. Node 600 may include one or many transceivers, although only one transceiver 630 is shown for simplicity of illustration. An antenna 640 is shown as a possible communication mechanism for node 600. Multiple antennas and/or arrays of antennas may be utilized. Additionally, examples of node 600 may communicate using wired techniques rather than (or in addition to) wireless techniques. For example, access node 520 may communicate wirelessly to user equipment 510 and may communicate by a wired connection (for example, by optical or coaxial cable) to core network element 530. Other communication hardware, such as a network interface card (NIC), can be included.

When node 600 is a user equipment, additional components may also be included, such as a user interface (UI), sensors, and the like. Similarly, node 600 may be implemented as a blade in a server system when node 600 is configured as a core network element 530. Other implementations are also possible.

As shown in FIG. 6, node 600 may include processor 610. Although only one processor is shown, it is understood that multiple processors can be included. Processor 610 may be any suitable computational device, such as a central processing unit (CPU), a microcontroller unit (MCU), application-specific integrated circuit (ASIC), field-programmable gate array (FPGA), or the like. Processor 610 may be a hardware device having one or many processing cores. In some embodiments in which node 600 corresponds to a modem, processor 610 may be a baseband processor.

As shown in FIG. 6, node 600 may also include memory 620. Although only memory is shown, it is understood that multiple memories can be included. Memory 620 can broadly include both memory and storage. For example, memory 620 can include random access memory (RAM) included on the same chip with processor 610. Memory 620 can also include storage, such as a hard disk drive (HDD), solid-state drive (SSD), or the like. Other memory types and storage types are also permitted.

Similarly, node 600 can also be configured as personal computer 550, router 560, tablet 570, database 580, or authentication server 590 in FIG. 5. Node 600 can be configured to perform any of the above-described methods using hardware alone or hardware operating together with software.

Another aspect of the disclosure is directed to a non-transitory computer-readable medium encoded with instructions that, when executed by at least one processor (e.g., processor 610 in FIG. 6), perform any processes disclosed herein. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc, a flash drive, or a solid-state drive having the computer instructions stored thereon.

Figure 7:
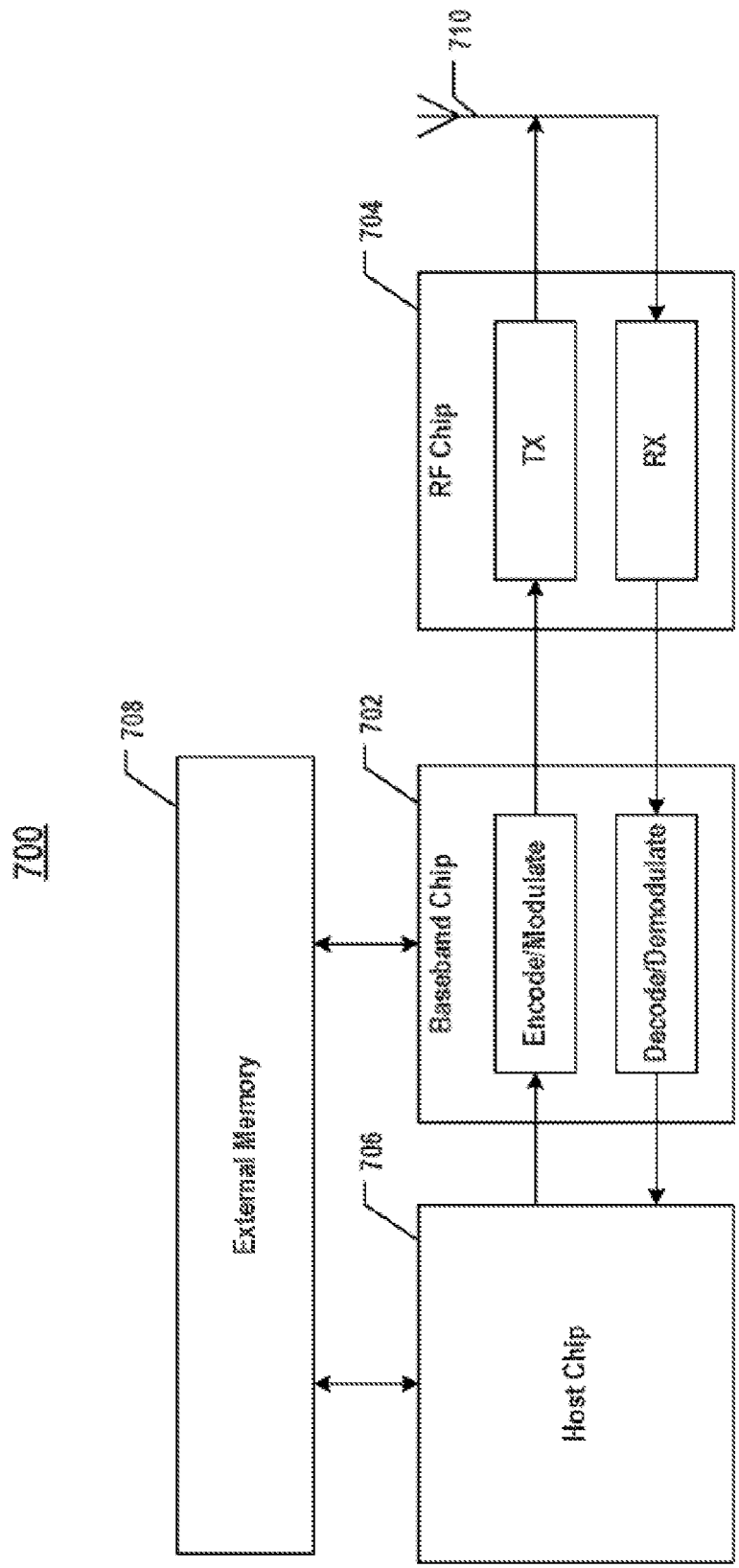
FIG. 7 illustrates a block diagram of an apparatus, according to some embodiments of the present disclosure.

FIG. 7 illustrates a block diagram of an apparatus 700 including a baseband chip 702, a radio frequency chip 704, and a host chip 706, according to some embodiments of the present disclosure. Apparatus 700 may be an example of any suitable node of wireless network 500 in FIG. 5, such as user equipment 510 or access node 520. As shown in FIG. 7, apparatus 700 may include baseband chip 702, radio frequency chip 704, host chip 706, and one or more antennas 710. In some embodiments, baseband chip 702 is implemented by processor 610 and memory 620, and radio frequency chip 704 is implemented by processor 610, memory 620, and transceiver 630, as described above with respect to FIG. 6. Besides the on-chip memory (also known as "internal memory" or "local memory," e.g., registers, buffers, or caches) on each chip 702, 704, or 706, apparatus 700 may further include an external memory 708 (e.g., the system memory or main memory) that can be shared by each chip 702, 704, or 706 through the system/main bus. Although baseband chip 702 is illustrated as a standalone SoC in FIG. 7, it is understood that in one example, baseband chip 702 and radio frequency chip 704 may be integrated as one SoC; in another example, baseband chip 702 and host chip 706 may be integrated as one SoC; in still another example, baseband chip 702, radio frequency chip 704, and host chip 706 may be integrated as one SoC, as described above.

In the uplink, host chip 706 may generate raw data and send it to baseband chip 702 for encoding, modulation, and mapping. Baseband chip 702 may also access the raw data generated by host chip 706 and stored in external memory 708, for example, using the direct memory access (DMA). Baseband chip 702 may first encode (e.g., by source coding and/or channel coding) the raw data and modulate the coded data using any suitable modulation techniques, such as multi-phase pre-shared key (MPSK) modulation or quadrature amplitude modulation (QAM). Baseband chip 702 may perform any other functions, such as symbol or layer mapping, to convert the raw data into a signal that can be used to modulate the carrier frequency for transmission. In the uplink, baseband chip 702 may send the modulated signal to radio frequency chip 704. Radio frequency chip 704, through the transmitter (Tx), may convert the modulated signal in the digital form into analog signals, i.e., radio frequency signals, and perform any suitable front-end radio frequency functions, such as filtering, up-conversion, or sample-rate conversion. Antenna 710 (e.g., an antenna array) may transmit the radio frequency signals provided by the transmitter of radio frequency chip 704.

In the downlink, antenna 710 may receive radio frequency signals and pass the radio frequency signals to the receiver (Rx) of radio frequency chip 704. Radio frequency chip 704 may perform any suitable front-end radio frequency functions, such as filtering, down-conversion, or sample-rate conversion, and convert the radio frequency signals into low-frequency digital signals (baseband signals) that can be processed by baseband chip 702. In the downlink, baseband chip 702 may demodulate and decode the baseband signals to extract raw data that can be processed by host chip 706. Baseband chip 702 may perform additional functions, such as error checking, de-mapping, channel estimation, descrambling, etc. The raw data provided by baseband chip 702 may be sent to host chip 706 directly or stored in external memory 708.

Figure 8:
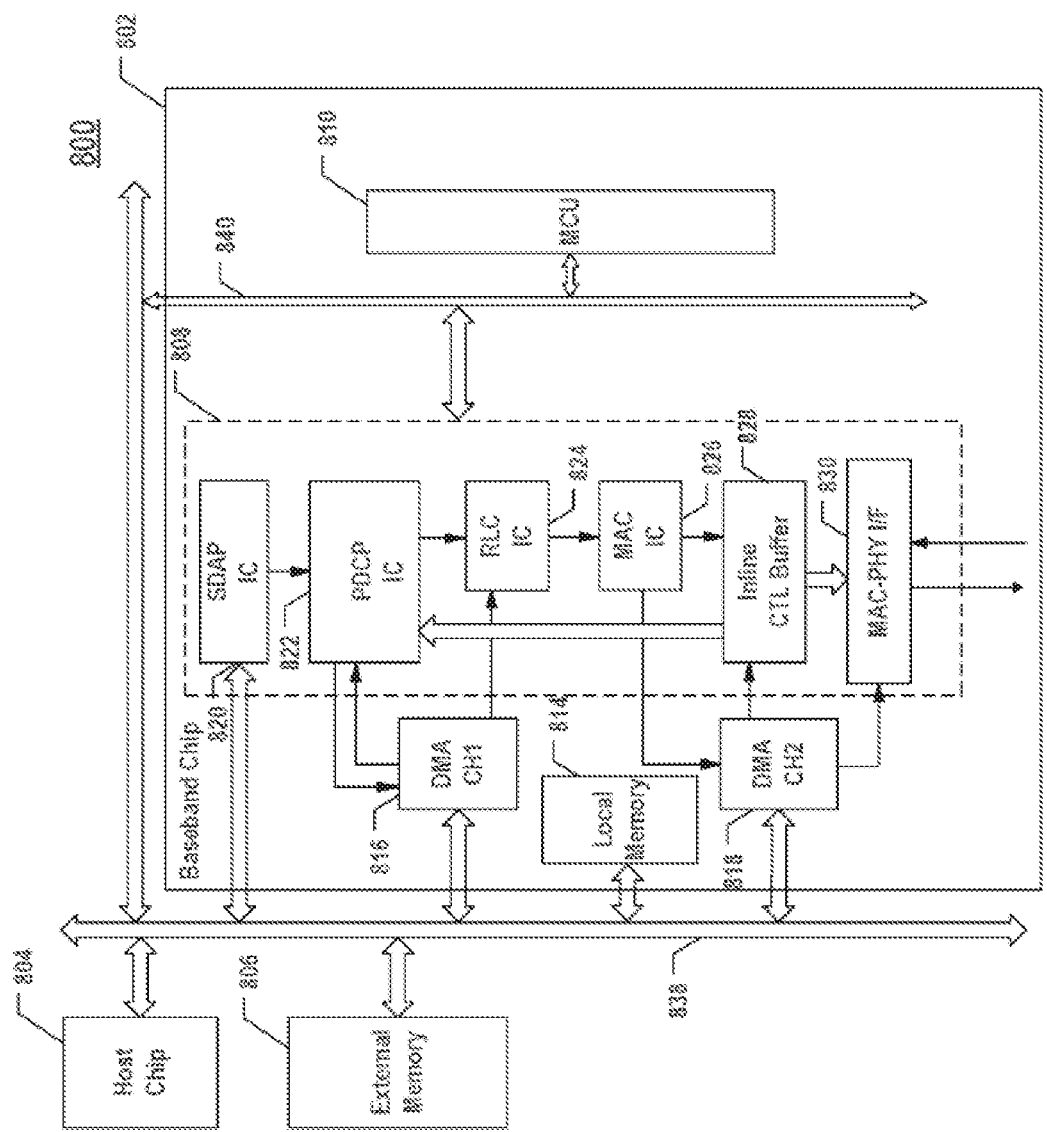
FIG. 8 illustrates a detailed block diagram of an example baseband chip, according to some embodiments of the present disclosure.

Baseband chip 702 in FIG. 7 may correspond to baseband chip 802 in FIG. 8. Baseband chip 702 may implement the protocol stack shown in FIG. 1, including MAC layer, RLC layer, and PDCP layer. Similarly, host chip 706 in FIG. 7 may correspond to host chip 804 in FIG. 8. Likewise, external memory 708 in FIG. 7 may correspond to external memory 806 in FIG. 8.

FIG. 8 illustrates a detailed block diagram of an example baseband chip 802 implementing Layer 2 uplink data processing using Layer 2 circuits 808 and an MCU 810, according to some embodiments of the present disclosure. In some embodiments, Layer 2 circuits 808 include a service data adaptation protocol (SDAP) circuit 820, a PDCP circuit 822, an RLC circuit 824, and a MAC circuit 826. As explained above, PDCP circuit 822 may correspond to PDCP layer in FIG. 1, and RLC circuit 824 and MAC circuit 826 may similarly correspond to RLC layer and MAC layer in FIG. 1, respectively. In some embodiments, each of SDAP, PDCP, RLC, and MAC circuits 820, 822, 824, or 826 is an integrated circuit (IC) dedicated to performing the functions of the respective layer in Layer 2 user plane. For example, each of SDAP, PDCP, RLC, and MAC circuits 820, 822, 824, or 826 may be an application-specific integrated circuit (ASIC), which is customized for a particular use, rather than intended for general-purpose use, and thus, is known for its high speed, small die size, and low power consumption compared with a generic processor. As another alternative, a general purpose processor, such as microcontroller unit (MCU) 810, can implement the PDCP layer, RLC layer, and MAC layer, as shown in FIG. 1.

Apparatus 800 may be any suitable node of wireless network 500 in FIG. 5, such as user equipment 510 or access node 520 (e.g., a base station including eNB in LTE or gNB in NR). As shown in FIG. 8, apparatus 800 may include baseband chip 802, a host chip 804, an external memory 806, and a main bus 838 (also known as a "system bus") operatively coupling baseband chip 802, host chip 804, and external memory 806. That is, baseband chip 802, host chip 804, and external memory 806 may exchange data through main bus 838. The baseband chip 802 may implement the methods shown in FIGS. 2, 3, and 4 and the architecture shown in FIG. 1. For example, SDAP circuit 820 may be configured, alone or together with MCU 810, to perform the mini-token bucket scheme, prior to passing the data on to PDCP circuit 822. Other implementations are also permitted. SDAP circuit 820 may also be able to access and utilize external memory 806 and local memory 814 using, for example, main bus 838.

As shown in FIG. 8, baseband chip 802 may also include a plurality of direct memory access (DMA) channels including a first DMA channel (DMA CH1) 816 and a second DMA channel (DMA CH2) 818. Each DMA channel 816 or 818 can allow certain Layer 2 circuits 808 to access external memory 806 directly independent of host chip 804. In some embodiments, DMA channels 816 and 818 may include a DMA controller and any other suitable input/output (I/O) circuits. As shown in FIG. 8, baseband chip 802 may further include a local memory 814, such as an on-chip memory on baseband chip 802, which is distinguished from external memory 806 that is an off-chip memory not on baseband chip 802. In some embodiments, local memory 814 includes one or more L1, L2, L3, or L4 caches. Layer 2 circuits 808 may access local memory 814 through main bus 838 as well.

As shown in FIG. 8, baseband chip 802 may further include a local bus 840. In some embodiments, MCU 810 is operatively coupled to Layer 2 circuits 808 and main bus 838 through local bus 840.

Referring to Layer 2 circuits 808, Layer 2 circuits 808 may be configured to provide Layer 1 transport blocks (as the outputs of Layer 2 circuits 808) and provide Layer 3 data packets (as the inputs of Layer 2 circuits 808) to the Layer 1 transport blocks in an in-line manner In some embodiments, Layer 2 circuits 808 are configured to pass data through each layer of Layer 2 circuits 808 without storing the data in external memory 806. The data may flow from upper to lower layers in Layer 2 (e.g., PDCP circuit 822, RLC circuit 824, and MAC circuit 826).

As shown in FIG. 8, MAC-PHY interface 830 may be operatively coupled to in-line control buffer 828 and configured to provide the Layer 1 transport blocks to Layer 1 (e.g., the PHY layer). The operations of MAC-PHY interface 830 may be controlled based on a set of interface commands from MCU 810. Each Layer 1 transport block may contain data from the previous radio subframe, having multiple or partial packets, depending on scheduling and modulation. Each Layer 1 transport block may correspond to a MAC PDU and include a payload (e.g., having encrypted data) and multiple headers (e.g., MAC header, RLC header, and PDCP header).

As shown in FIG. 8, in-line control buffer 828 may be operatively coupled to MAC-PHY interface 830 and configured to store the Layer 1 transport blocks sent by MAC-PHY interface 830. In-line control buffer 828 may be a separate physical memory component or part of local memory 814 (e.g., a logical partition thereof) dedicated to Layer 2 uplink data processing. Layer 2 circuits 808 in baseband chip 802 may perform Layer 2 uplink data processing in an in-line manner without access to external memory 806.

As shown in FIG. 8, MAC circuit 826 may be operatively coupled to in-line control buffer 828 and RLC circuit 824 and configured to prepare the MAC headers of the Layer 1 transport blocks to be stored in in-line control buffer 828. The preparation of the MAC headers by MAC circuit 826 may be controlled based on a set of MAC commands from MCU 810.

As shown in FIG. 8, RLC circuit 824 may be operatively coupled to MAC circuit 826 and PDCP circuit 822 and configured to prepare the RLC headers of the Layer 1 transport blocks to provided to MAC circuit 826. The preparation of the RLC headers may be controlled based on a set of RLC commands from MCU 810.

As shown in FIG. 8, PDCP circuit 822 may be operatively coupled to RLC circuit 824 and SDAP circuit 820 and configured to prepare the PDCP headers of the Layer 1 transport blocks to be provided to RLC circuit 824. The preparation of the PDCP headers may be controlled based on a set of PDCP commands from MCU 810.

According to one aspect of the present disclosure, a method for packet preparation for uplink transmission can include determining, by a user equipment, a quality of service identifier associated with a quality of service flow. The method can also include mapping, by the user equipment, the quality of service identifier to a group token level. The method can further include processing, by the user equipment, the quality of service flow in accordance with the group token level.

In some embodiments, the determining can be performed during quality of service flow setup for the quality of service flow.

In some embodiments, the quality of service identifier can be a fifth-generation (5G) quality of service identifier.

In some embodiments, the mapping can include calculating the group token level based on a plurality of attributes of the quality of service flow.

In some embodiments, the plurality of attributes can include at least one of priority of level of the quality of service flow, resource type, or packet delay budget.

In some embodiments, each of the plurality of attributes can be separately weighted in the calculating the group token level.

In some embodiments, the method can further include allocating a highest priority queue with a maximum priority and an unlimited bucket size.

In some embodiments, the processing can include sorting the quality of service flow in order of priority access based on the group token level.

In some embodiments, the method can further include receiving a grant for uplink communication. The grant can include a grant size of bytes. The method can also include distributing the grant size of bytes across a plurality of logical channels. The method can additionally include distributing the grant size of bytes among a plurality of quality of service flows comprising the quality of service flows. The distributing the grant size of bytes among the plurality of quality of service flows can be performed based on respective group token levels of respective quality of service flows.

In some embodiments, the distributing the grant size of bytes among the plurality of quality of service flows can be performed on a per logical channel basis.

In some embodiments, the distributing the grant size of bytes among the plurality of quality of service flows can include calculating a number of bytes per group token level based on a sum of group token levels for all of the plurality of quality of service flows.

In some embodiments, the distributing the grant size of bytes among the plurality of quality of service flows can further include assigning mini token buckets proportionally among the plurality of quality of service flows.

In some embodiments, the distributing the grant size of bytes among the plurality of quality of service flows can further include assigning leftover from a higher priority quality of service flow bucket to a lower priority quality of service flow bucket.

In some embodiments, the method can further include dequeueing data from each of the plurality of quality of service flows in order of the respective group token levels.

In some embodiments, the distributing the grant size of bytes across the plurality of logical channels can include assigning remaining grant size of bytes from a first logical channel to a next logical channel after distributing the grant size of bytes among the plurality of quality of service flows in the first logical channel.

According to another aspect of the present disclosure, an apparatus for packet preparation for uplink transmission can include at least one processor and at least one memory including computer program code. The at least one memory and the computer program code can be configured to, with the at least one processor, cause the apparatus at least to determine a quality of service identifier associated with a quality of service flow. The at least one memory and the computer program code can also be configured to, with the at least one processor, cause the apparatus at least to map the quality of service identifier to a group token level. The at least one memory and the computer program code can further be configured to, with the at least one processor, cause the apparatus at least to process the quality of service flow in accordance with the group token level.

In some embodiments, the at least one memory and the computer program code can be configured to, with the at least one processor, cause the apparatus at least to map the quality of service identifier to the group token level by calculating the group token level based on a plurality of attributes of the quality of service flow.

In some embodiments, the at least one memory and the computer program code can be further configured to, with the at least one processor, cause the apparatus at least to receive a grant for uplink communication. The grant can include a grant size of bytes. The at least one memory and the computer program code can also be further configured to, with the at least one processor, cause the apparatus at least to distribute the grant size of bytes across a plurality of logical channels. The at least one memory and the computer program code can be additionally configured to, with the at least one processor, cause the apparatus at least to distribute the grant size of bytes among a plurality of quality of service flows comprising the quality of service flows. The distributing the grant size of bytes among the plurality of quality of service flows can be performed based on respective group token levels of respective quality of service flows.

In some embodiments, the at least one memory and the computer program code can be further configured to, with the at least one processor, cause the apparatus at least to dequeue data from each of the plurality of quality of service flows in order of the respective group token levels.

In some embodiments, the at least one memory and the computer program code are configured to, with the at least one processor, cause the apparatus at least to distribute the grant size of bytes across the plurality of logical channels by assigning remaining grant size of bytes from a first logical channel to a next logical channel after distributing the grant size of bytes among the plurality of quality of service flows in the first logical channel.

According to a further aspect of the present disclosure, a non-transitory computer-readable medium can be encoded with instructions that, when executed by a processor, cause the processor at least to perform a process for packet preparation for uplink transmission. The process can include determining, by the user equipment, a quality of service identifier associated with a quality of service flow. The process can also include mapping, by the user equipment, the quality of service identifier to a group token level. The process can further include processing, by the user equipment, the quality of service flow in accordance with the group token level.

According to yet another aspect of the present disclosure, a baseband chip for packet preparation for uplink transmission can include a service data adaptation protocol circuit, a packet data convergence protocol circuit, and a medium access control circuit. The service data adaptation protocol circuit can be configured to determine a quality of service identifier associated with a quality of service flow, map the quality of service identifier to a group token level, process the quality of service flow in accordance with the group token level, and provide the quality of service flow to the packet data convergence protocol circuit to passed toward the medium access control circuit for transmission by a physical layer circuit.

The foregoing description of the specific embodiments will so reveal the general nature of the present disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The Summary and Abstract sections may set forth one or more but not all exemplary embodiments of the present disclosure as contemplated by the inventor(s), and thus, are not intended to limit the present disclosure and the appended claims in any way.

Various functional blocks, modules, and steps are disclosed above. The particular arrangements provided are illustrative and without limitation. Accordingly, the functional blocks, modules, and steps may be re-ordered or combined in different ways than in the examples provided above. Likewise, certain embodiments include only a subset of the functional blocks, modules, and steps, and any such subset is permitted.

The breadth and scope of the present disclosure should not be limited by any of the above-described example embodiments, but should be defined only in accordance with the following claims and their equivalents.

What is claimed is:

1. A method for packet preparation for uplink transmission, comprising:
    determining, by a user equipment, a quality of service identifier associated with a quality of service flow;
    mapping, by the user equipment, the quality of service identifier to a group token level; and
    processing, by the user equipment, the quality of service flow in accordance with the group token level,
    wherein the mapping comprises calculating the group token level based on a plurality of attributes of the quality of service flow, and the plurality of attributes comprise priority of level of the quality of service flow, resource type and packet delay budget, and
    wherein the mapping is tuned flexibly at static setup or dynamic runtime to suit application performance needs.

2. The method of claim 1, wherein the determining is performed during quality of service flow setup for the quality of service flow.

3. The method of claim 1, wherein the quality of service identifier comprises a fifth-generation (5G) quality of service identifier.

4. The method of claim 1, wherein each of the plurality of attributes is separately weighted in the calculating the group token level.

5. The method of claim 1, further comprising:
allocating a highest priority queue with a maximum priority and an unlimited bucket size.

6. The method of claim 1, further comprising:
receiving a grant for uplink communication, wherein the grant comprises a grant size of bytes;
distributing the grant size of bytes across a plurality of logical channels; and
distributing the grant size of bytes among a plurality of quality of service flows comprising the quality of service flows, wherein the distributing the grant size of bytes among the plurality of quality of service flows is performed based on respective group token levels of respective quality of service flows.

7. The method of claim 6, wherein the distributing the grant size of bytes among the plurality of quality of service flows is performed on a per logical channel basis.

8. The method of claim 6, wherein the distributing the grant size of bytes among the plurality of quality of service flows comprises calculating a number of bytes per group token level based on a sum of group token levels for all of the plurality of quality of service flows.

9. The method of claim 8, wherein the distributing the grant size of bytes among the plurality of quality of service flows further comprises assigning mini-token buckets proportionally among the plurality of quality of service flows.

10. The method of claim 9, wherein the distributing the grant size of bytes among the plurality of quality of service flows further comprises assigning leftover from a higher priority quality of service flow bucket to a lower priority quality of service flow bucket.

11. The method of claim 6, further comprising:
dequeueing data from each of the plurality of quality of service flows in order of the respective group token levels.

12. The method of claim 6, wherein the distributing the grant size of bytes across the plurality of logical channels comprises assigning remaining grant size of bytes from a first logical channel to a next logical channel after distributing the grant size of bytes among the plurality of quality of service flows in the first logical channel.

13. An apparatus for packet preparation for uplink transmission, comprising:
at least one processor; and
at least one memory including computer program code,
wherein the at least one memory and the computer program code are configured to, with the at least one processor, cause the apparatus at least to:
determine a quality of service identifier associated with a quality of service flow;
map the quality of service identifier to a group token level; and
process the quality of service flow in accordance with the group token level,
wherein the at least one memory and the computer program code are configured to, with the at least one processor, cause the apparatus at least to map the quality of service identifier to the group token level by calculating the group token level based on a plurality of attributes of the quality of service flow, and the plurality of attributes comprise priority of level of the quality of service flow, resource type and packet delay budget, and
wherein the mapping is tuned flexibly at static setup or dynamic runtime to suit application performance needs.

14. The apparatus of claim 13, wherein the at least one memory and the computer program code are further configured to, with the at least one processor, cause the apparatus at least to:
receive a grant for uplink communication, wherein the grant comprises a grant size of bytes;
distribute the grant size of bytes across a plurality of logical channels; and
distribute the grant size of bytes among a plurality of quality of service flows comprising the quality of service flows, wherein the distributing the grant size of bytes among the plurality of quality of service flows is performed based on respective group token levels of respective quality of service flows.

15. The apparatus of claim 14, wherein the at least one memory and the computer program code are further configured to, with the at least one processor, cause the apparatus at least to:
dequeue data from each of the plurality of quality of service flows in order of the respective group token levels.

16. The apparatus of claim 14, wherein the at least one memory and the computer program code are configured to, with the at least one processor, cause the apparatus at least to distribute the grant size of bytes across the plurality of logical channels by assigning remaining grant size of bytes from a first logical channel to a next logical channel after distributing the grant size of bytes among the plurality of quality of service flows in the first logical channel.

17. A baseband chip for packet preparation for uplink transmission, comprising:
a service data adaptation protocol (SDAP) circuit;
a packet data convergence protocol (PDCP) circuit; and
a medium access control (MAC) circuit,
wherein the SDAP circuit is configured to
determine a quality of service identifier associated with a quality of service flow;
map the quality of service identifier to a group token level;
process the quality of service flow in accordance with the group token level; and
provide the quality of service flow to the PDCP circuit to pass toward the MAC circuit for transmission by a physical layer circuit,
wherein the SDAP circuit is configured to is further configured to map the quality of service identifier to the group token level by calculating the group token level based on a plurality of attributes of the quality of service flow, and the plurality of attributes comprise priority of level of the quality of service flow, resource type and packet delay budget, and
wherein the mapping is tuned flexibly at static setup or dynamic runtime to suit application performance needs.

* * * * *